US010216311B2

(12) United States Patent
Deasy et al.

(10) Patent No.: US 10,216,311 B2
(45) Date of Patent: Feb. 26, 2019

(54) USER AUTHENTICATION

(71) Applicant: International Business Machines Corporation, Armonk, NY (US)

(72) Inventors: Ciaran J. Deasy, Eastleigh (GB); Katherine R. Farmer, Hants (GB); Andrew J. Seymour, Hursley (GB); Liam A. White, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 15/423,824

(22) Filed: Feb. 3, 2017

(65) Prior Publication Data

US 2018/0224989 A1    Aug. 9, 2018

(51) Int. Cl.
| | | |
|---|---|---|
| *G06F 3/041* | (2006.01) | |
| *G06F 3/01* | (2006.01) | |
| *G06F 3/16* | (2006.01) | |
| *G06F 21/36* | (2013.01) | |

(52) U.S. Cl.
CPC ............ *G06F 3/0414* (2013.01); *G06F 3/016* (2013.01); *G06F 3/167* (2013.01); *G06F 21/36* (2013.01)

(58) Field of Classification Search
CPC ........ G06F 21/31; G06F 21/32; G06F 3/0488; G06F 3/041
See application file for complete search history.

(56) References Cited

U.S. PATENT DOCUMENTS

| | | | |
|---|---|---|---|
| 6,954,862 B2 | 10/2005 | Serpa | |
| 8,650,635 B2 | 2/2014 | Griffin et al. | |
| 2014/0176332 A1* | 6/2014 | Alameh | G06F 21/32 340/665 |
| 2018/0260108 A1* | 9/2018 | Hajimusa | G06F 3/167 |

FOREIGN PATENT DOCUMENTS

| | | |
|---|---|---|
| CN | 102982269 | 3/2013 |
| EP | 3002100 | 4/2016 |

OTHER PUBLICATIONS

Kim et al., Multi-Touch Authentication on Tabletops, CHI 2010: Input, Security, and Privacy Policies, Apr. 10-15, 2010, pp. 1093-1102.

* cited by examiner

*Primary Examiner* — Gerald Johnson
(74) *Attorney, Agent, or Firm* — Schmeiser, Olsen & Watts, LLP; Brian Restauro

(57) ABSTRACT

A method, computer system, and computer program product for authenticating a user is provided. The method includes the steps of receiving a user input via a pressure-sensitive input interface, the user input being indicative of a possible component part of an authentication code or pattern, determining a pressure applied to the pressure-sensitive input interface by the user when providing the user input, determining whether to ignore the user input as a component part of the authentication code or pattern based on the pressure applied and irrespective of the whether the user input is determined to be ignored, providing an input acknowledgement signal to an output interface for indicating the user input was received. An associated apparatus is also included.

16 Claims, 8 Drawing Sheets

USER AUTHENTICATION

TECHNICAL FIELD

The present invention relates to relates user authentication, and more particularly to method for authenticating a user of a pressure-sensitive input interface.

BACKGROUND

Commonly-used authentication methods require a user to input (e.g. type or 'key-in') an authentication code or pattern, such as password, code, Personal Identification Number (PIN), or secret key-phrase, via an input interface. When inputting or 'entering' such authentication information, a third-party or attacker may be able to observe the input information (e.g. by looking over the user's shoulder, which is referred to as 'shoulder surfing').

Such potential, unwanted exposure of secret or sensitive authentication information is particularly problematic with the use of an automated teller machine (ATM), but is also becoming highly problematic with widespread adoption and use of mobile computing devices (e.g. tablet computer and smartphones).

Concepts for protecting secret or sensitive authentication as the secret or sensitive authentication is being input to a user interface have been proposed, but the concepts typically are not usable on smaller portable computing devices. Moreover, the input information may still be vulnerable if the third-party or attacker (e.g. 'shoulder surfer') is able to see a row letter being used.

SUMMARY

An aspect of this invention relates to a method, and associated computer system and computer program product, for authenticating a user. A processor of a computing system receives a user input via a pressure-sensitive input interface, the user input being indicative of a possible component part of an authentication code or pattern. A pressure applied to the pressure-sensitive input interface by the user when providing the user input is determined. Whether to ignore the user input as a component part of the authentication code or pattern based on the pressure applied is also determined. Irrespective of whether the user input is determined to be ignored, an input acknowledgement signal is provided to an output interface for indicating the user input was received.

A further aspect of this invention is an apparatus for authenticating a user. The apparatus includes a pressure-sensitive input interface adapted to receive a user input, the user input being indicative of a possible component part of an authentication code or pattern, a pressure determination arrangement adapted to determine a pressure applied to the pressure-sensitive input interface by the user when providing the user input, a processing unit adapted to determine whether to ignore the user input as a component part of the authentication code or pattern based on the pressure applied, and an output interface adapted to provide an input acknowledgement signal for indicating the user input was received, irrespective of the whether the processing unit determined to ignore the user input.

DETAILED DESCRIPTION

Figure 1:
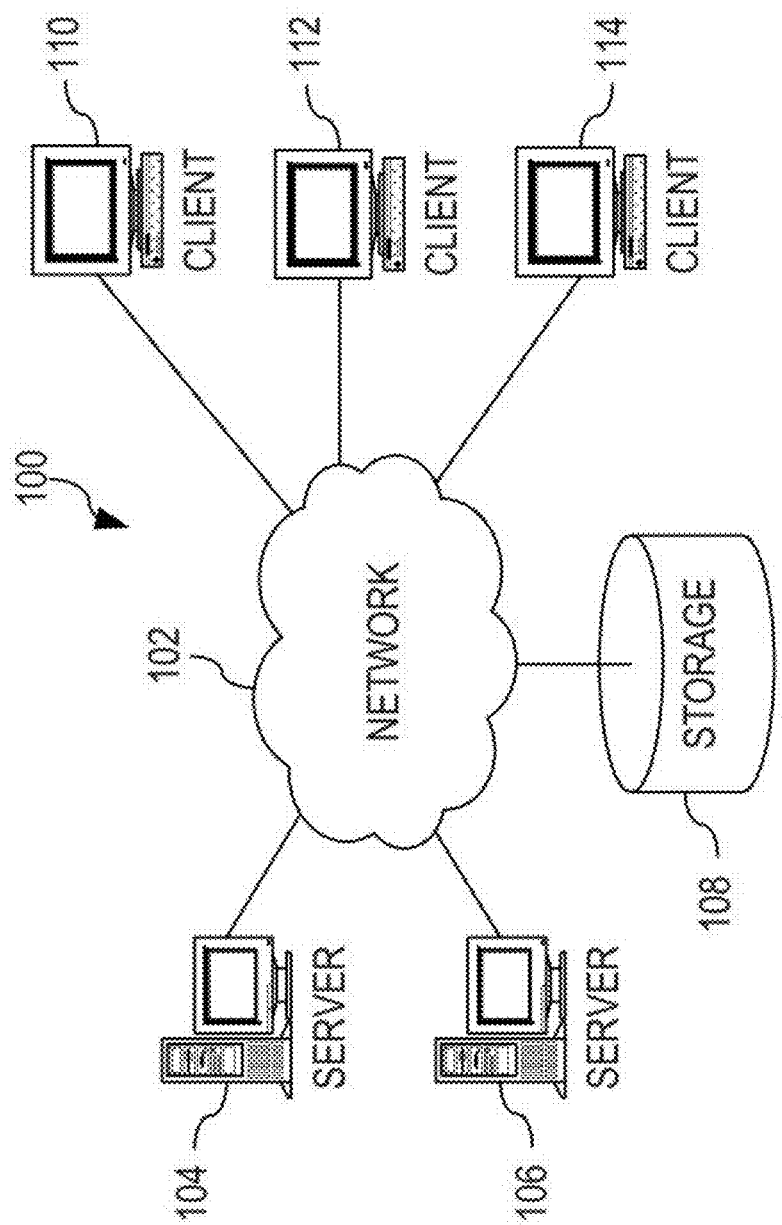
FIG. 1 depicts a pictorial representation of a distributed system, in accordance with embodiments of the present invention.

Embodiments of the invention may enable a user to falsify or fake input information that may be visible to a third-party watching the user input the information via an input interface. By using or ignoring inputs based on the pressure applied to the input interface when entering the inputs, embodiments may allow a user to enter inputs that, although ignored as a part of the input information, appear to form part of the input information through the eyes of a viewing third-party (e.g. shoulder surfer). In this way, and by way of example only, a user may input an authentication code or pattern via a pressure-sensitive input interface and distinguish between 'real' and 'fake' inputs (e.g. components of the code or pattern) by applying two different pressures to the pressure-sensitive input interface for the inputs, a first pressure for the real inputs and a second pressure for the fake inputs. Inputs provided using the second applied pressure may then be identified and ignored as actual inputs, such that only inputs provided using the first applied pressure may be used as actual inputs (e.g. actual components of the code or pattern). However, for each provided input (irrespective of the pressure applied), an input acknowledgement signal (such as an audible noise and/or visible graphic) may be provided via an output interface so as to indicate each user input was received, thereby indicating to a viewing third-party that all inputs form part of the authentication code or pattern. The input acknowledgement signal may mislead the viewing third-party into believing that the fake inputs were indeed input by the user and are components of the authentication code or pattern.

Embodiments may thus provide for an input concept which allows a user to use differing amounts of pressure to enter information (e.g. numbers, letters, symbols, commands, alpha-numeric characters, etc.) that does not form part of the information the user intends to actually use, which may enable users to feign or fake the inputting of sensitive or private information in a convincing manner so as to mislead or deceive a third-party watching the user input the information (e.g. over the user's shoulder or via a hidden camera). Embodiments may further enhance the falsification of input information by outputting (e.g. communicating) an acknowledgement signal which indicates that input information has been received/used, even though the input information may have been disregarded as not forming part of the information the user intends to use.

Embodiments may avoid a user having to remember separate and potentially complicated information for improving the security of an authentication code or pattern. Further, embodiments may provide improved flexibility to a user by enabling dummy or fake inputs (e.g. components parts of an authentication code or pattern) to be input whenever desired and in whichever order is desired. Such flexibility in providing fake or false inputs may actually further improve security by avoiding the need for fixed patterns or arrangements of fake or false inputs to be used. For instance, embodiments may enable fake inputs to be input at random anywhere in an authentication code or pattern.

Furthermore, many different ways to implement pressure-sensitive input interfaces and/or to identify and distinguish inputs provided at different applied pressures may be employed by embodiments, some of which are already widely known and employed in input interfaces and computing systems. For example, touch-sensitive display panels that can distinguish between touches at various pressures are widely available. Also, keyboard and keypads that employ buttons/keys that can distinguish between at least two different pressures applied to buttons/keys are known and widely available. Accordingly, technical requirements for embodiments may already be known and widely available, thus enabling embodiments to be implemented relatively easily and/or cheaply.

Embodiments may further comprise: providing a haptic feedback signal to the user based on the pressure applied, the haptic feedback signal being indicative of whether or not the user input is ignored as a component part of the authentication code or pattern. Thus, the user may be provided with an invisible signal (e.g. a signal that the user may perceive by touch, such a vibration) that informs the user that a fake/false input has been identified and disregarded. Provision of a haptic signal, which cannot be viewed by a third-person for example, may thus enable the user to know that a false input has been identified whilst not informing a watching third-party of the same.

The step of determining whether or not to ignore the user input may comprise: comparing the pressure applied with a threshold value; and determining to ignore the user input based on the comparison result. Embodiments may therefore enable the concept of distinguishing between inputs by simply applying a pressure a pressure-sensitive input interface that is either greater than or less than a predetermined amount. For instance, the step of determining to ignore the user input may comprise determining to ignore the user input if the comparison result indicates the pressure applied is less than the threshold value. In this way, when a user presses lightly (e.g. applies a low pressure) on the pressure-sensitive interface to input a component part of an authentication code, the component part may be identified as being false and thus ignored (e.g. not used or recognized) as a component part of an authentication code that the user actually desires to use for authentication purposes. Conversely, when a user presses normally or heavily (e.g. applies a medium or high pressure) on the pressure-sensitive interface to input a component part of an authentication code, the component part may be identified as being true and thus used or recognized as a component part of an authentication code that the user actually desires to use for authentication purposes.

In some embodiments, the input acknowledgement signal may be adapted to cause the output interface to communicate a visual or audio signal indicating that the user input was received via the pressure-sensitive input interface. By way of example, for every input provided by the user, an embodiment may be adapted to control a display screen to display a graphical element indicating that the input has been entered (e.g. successfully received and used). In this way, a visible indication may be provided to a viewing third-party which indicates that an input has been entered, even though the input has been identified by the embodiment as being fake/false and thus disregarded as a component part of an authentication code or pattern. Similarly, and by way of further example, for every input provided by the user, an embodiment may be adapted to control an audio output device (such as a loudspeaker) to output an audible signal indicating that the input has been entered (e.g. successfully received and used). In this way, an audible indication (e.g. beep, bleep or click) may be provided to a viewing and/or listening third-party which indicates that an input has been entered, even when the input has been identified by the embodiment as being fake/false and thus disregarded as a component part of an authentication code or pattern. The viewing and/or listening third-party may then be misled into thinking fake/false inputs provided by a user form part of the authentication code or pattern.

According to another embodiment of the present invention, there is provided a computer program product for authenticating a user, the computer program product comprising a computer readable hardware storage device having program instructions embodied therewith, the program instructions executable by a processing unit to cause the processing unit to perform a method comprising: receiving a user input via a pressure-sensitive input interface, the user input being indicative of a possible component part of an authentication code or pattern; determining a pressure applied to the pressure-sensitive input interface by the user when providing the user input; determining whether or not to ignore the user input as a component part of the authentication code or pattern based on the pressure applied; and irrespective of the whether it is determined to ignore the user input, providing an input acknowledgement signal to an output interface for indicating the user input was received.

The computer-readable hardware storage device may be selected from the group consisting of a CD, a DVD, a flash memory card, a USB memory stick, a random access memory, a read-only memory, a computer hard disk, a storage area network, a network server, and an Internet server.

According to another embodiment of the present invention, there is provided a computer system comprising: a computer program product according to an embodiment; and a processing unit adapted to perform all of the steps of method according to an embodiment by execution of the computer-readable program code of said computer program product.

According to another embodiment of the present invention, there is provided apparatus for authenticating a user, the apparatus comprising: a pressure-sensitive input interface adapted to receive a user input, the user being indicative of a possible component part of an authentication code or pattern; a pressure determination arrangement adapted to determine a pressure applied to the pressure-sensitive input interface by the user when providing the user input; a processing unit adapted to determine whether or not to ignore the user input as a component part of the authentication code or pattern based on the pressure applied; and an output interface adapted to provide an input acknowledgement signal for indicating the user input was received, irrespective of the whether the processing unit determined to ignore the user input.

Thus, there may be an information input apparatus which can automatically and dynamically distinguish between false and real user inputs based on a pressure applied when providing the user inputs. The apparatus may, for example, process a received user input, in real time, so as to provide a modified user input wherein falsified or dummy user inputs are ignored or disregarded whilst providing an acknowledgement signal for indicating all of the user inputs have been used, irrespective of the whether the inputs have been used or ignored/disregarded. In this way, the acknowledgement signal may mislead a third-party into thinking that the falsified or dummy user inputs form part of the input information. For example, the apparatus may enable a user to input an authentication code or password comprising dummy or fake component parts (e.g. false characters or numbers), so as to prevent a viewing third-party from learning the correct/real authentication code or password by watching the user input information. An embodiment of an apparatus may therefore use applied-pressure information to identify and disregard user inputs in real-time so as to avoid unnecessary time delays caused by extensive processing of the input information.

Embodiments may further comprise a haptic feedback arrangement adapted to provide a haptic feedback signal to the user based on the pressure applied, the haptic feedback signal being indicative of whether or not the user input is ignored as a component part of the authentication code or pattern. By way of example, the haptic feedback arrangement may comprise a vibrator that is adapted to vibrate so as to provide a vibration signal that can be felt or sensed by the user (e.g. by touch). The haptic feedback signal may indicate to the user that a fake/false input has been identified and ignored. Provision of such a haptic signal may thus enable the user to know that a false input has been identified whilst preventing a watching third-party from knowing the same.

Embodiments may be employed in data entry devices, portable computing devices, keyboards and/or keypads and may be of particular use in ATMs, door entry systems, locking systems, or any other devices which may enable a person to input potentially secret or sensitive authentication information (such as a Personal Identification Number (PIN), passcode, or password) by touch of a user interface). For instance, such systems may be adapted to capture a user input passcode containing eight valid characters and two dummy characters and then identify and disregard the two dummy characters whilst displaying on a screen (and thus to a viewing third-party) graphic elements indicating that the passcode input by the user contained ten characters.

In some embodiments, the processing unit may be adapted to compare the pressure applied with a threshold value, and to determine to ignore the user input based on the comparison result. For example, the processing unit may be adapted to determine to ignore the user input if the comparison result indicates the pressure applied is less than the threshold value.

In an embodiment, the output interface may be adapted to communicate, based on the input acknowledgement signal, an audible or visible signal indicating that the user input was received via the pressure-sensitive input interface.

Embodiments may be employed in mobile computing devices, such as tablet computers, laptop computers, smart (e.g. internet-enabled) televisions or displays, smartphones or other communication devices, personal digital assistants (PDAs), or the like.

Embodiments may also be employed in a user input device comprising apparatus for authenticating a user, such a keypad for an ATM, safe or door entry device.

Embodiments of the present invention may include a data input concept that enables a user to employ differing amounts of pressure to enter dummy or fake information that may be visible to a third-party watching the user input the information. In this way, a third-party may be misled as to the information being input by the user, thereby enabling a user to protect sensitive or secret information, such as an authentication code or pattern.

Embodiments may use or ignore inputs based on the pressure applied to a pressure-sensitive input interface when entering the inputs, which may allow a user to enter dummy inputs that appear to form part of the input information (through the eyes of a viewing third-party) although the dummy inputs are disregarded as a part of the input information. For each user-provided input (irrespective of the pressure applied), an input acknowledgement signal (such as an audible noise and/or visible graphic) may be provided via an output interface so as to indicate each user input was received, thereby signifying to a viewing third-party that all inputs (including the dummy inputs) form part of the input information (e.g. the authentication information). Providing the input acknowledgement signal may trick the viewing third-party into believing that the dummy inputs were input by the user and are components of the input information.

Embodiments may cater for the use of differing amounts of pressure to differentiate inputted information (e.g. numbers, letters, symbols, commands, alpha-numeric characters, etc.) between true information and false information (e.g. dummy, fake, pretend, imitation, etc.). Using differing amount of pressure to differentiate inputted information may enable a user to falsify the inputting of sensitive or private information in a manner that may mislead or deceive a third-party watching the user input the information (e.g. over the user's shoulder or via a hidden camera). Embodiments may enhance the falsification of input information by outputting (e.g. communicating) an acknowledgement signal which indicates that falsified input information (e.g. dummy input) has been received/used, even though it may have been disregarded as not being true information forming part of the information the user intends to use.

Embodiments may therefore provide a simple and flexible method for protecting private, secret or confidential information when being provided by a user via a touch-based user interface. Such embodiments may be employed using existing pressure-sensitive input interfaces that are already widely known and available. Accordingly, technical requirements for embodiments may be reduced to levels that enable embodiment to be implemented relatively easily and/or cheaply.

Furthermore, embodiments may enable real-time processing of user inputs, so as to avoid unnecessary time delays that may detract from user experience or negatively impact security protection provided. For instance, embodiments may enable user input to be captured and processed instantaneously so as to selectively keep or disregard user input in a transparent manner.

Illustrative embodiments may therefore provide concepts for protecting sensitive or private information that is input to a system via a touch-based (e.g. tactile) user interface. Any input processing system could be used with the concepts, but it may be preferable for such a system to exhibit at least one of the following qualities: data processing capabilities; and visual and/or audio communication capabilities.

Modifications and additional steps to conventional touch-based user interface systems are also provided which may enhance the value and utility of the concepts.

Reference to an authentication code or pattern may be taken to refer to any sequence or pattern of input information that may be used for user-authentication purposes, and such information may contain components that may be protected, confidential or sensitive in nature, such as text, images, alphanumeric characters, logos, shapes, colors, keys, codes, passwords, dates, locations, etc.

Reference to a pressure-sensitive input interface may be taken to refer to any input interface that is adapted to detect a pressure applied to the interface when a user provides an input via the interface. Examples of pressure-sensitive interface may include a touch-sensitive panel, a pressure-sensitive tactile interface, a force sensing panel, a plurality of differently force-resistant switches, and the like.

Figure 2:
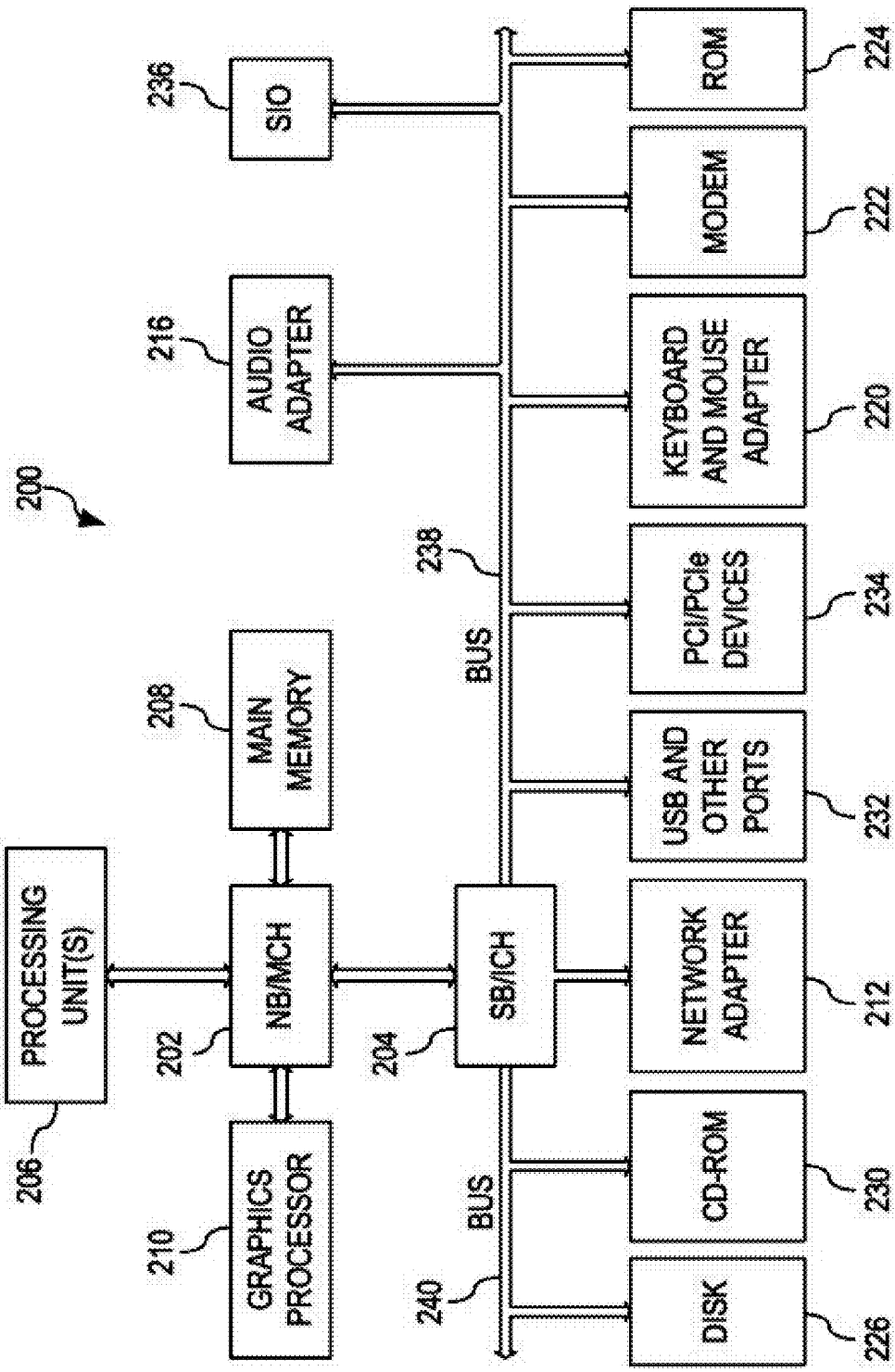
FIG. 2 is a block diagram of a portable computing system, in accordance with embodiments of the present invention.

Illustrative embodiments may be utilized in many different types of data processing environments. In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of a distributed system, in accordance with embodiments of the present invention. Distributed system 100 may include a network of computers in which aspects of the illustrative embodiments may be implemented. The distributed system 100 contains at least one network 102, which is the medium used to provide communication links between various devices and computers connected together within distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, smartphones, video capture devices, digital imaging devices, portable cameras, Oculus Rift® devices, VR devices, or the like. In the depicted example, the first server 104 provides data, such as boot files, operating system images, and applications to the clients 110, 112, and 114. Clients 110, 112, and 114 are clients to the first server 104 in the depicted example. The distributed prediction system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of a portable computing system 200, in accordance with embodiments of the present invention. The system 200 is an example of a portable computing device, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System P® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. Similarly, one or data structures according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as first bus 238 or second bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

The hardware in FIGS. 1 and 2 may vary depending on the implementation. Other internal hardware or peripheral devices, such as 3D spatial tracking devices, video capture devices, positioning systems, accelerometer arrangement, equivalent non-volatile memory, or optical disk drives and the like, may be used in addition to or in place of the hardware depicted in FIGS. 1 and 2. Also, the processes of the illustrative embodiments may be applied to a multiprocessor data or video processing system, other than the system mentioned previously, without departing from the scope of the embodiments.

Moreover, the system 200 may take the form of any of a number of different data or video processing systems including client computing devices, server computing devices, a tablet computer, laptop computer, smart (e.g. internet-enabled) television or display, smartphone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Embodiments may enhance a user authentication system or method by providing for false or dummy inputs to be provided by a user in a manner that misleads an observing third-party into thinking the dummy/false inputs form part of the information input the by user, thereby preventing the third-party from ascertaining sensitive or secret information.

Embodiments may employ a pressure-sensitive input interface to enable a user to input the false/dummy information that is disregarded as an actual input whilst appearing to be true input information to an observing third-party. By altering a pressure applied to the interface when inputting information, a user can distinguish between real/true input information and false/dummy information. Such pressure-based input classification concepts can be applied to authentication applications, arrangements and systems, thus improving the security of touch-based (e.g. tactile) authentication systems that may be visible to third-parties.

Figure 3:
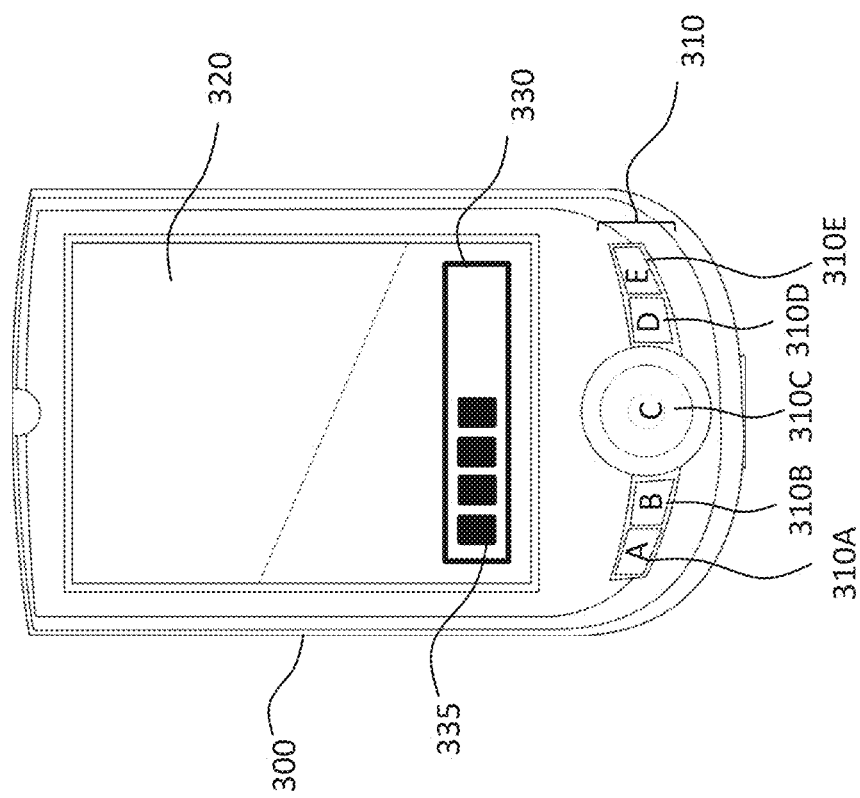
FIG. 3 is a simplified block diagram of a portable computing device, in accordance with embodiments of the present invention.

FIG. 3 is a simplified block diagram of a portable computing device 300, in accordance with embodiments of the present invention. In the example depicted in FIG. 3, the mobile computing device 300 is a PDA 300, but it will be appreciated that similar examples may comprise a smartphone, tablet computer, or the like.

The PDA 300 comprises an apparatus for authenticating a user according to an exemplary embodiment. More specifically, the PDA 300 comprises a pressure-sensitive input interface 310 adapted to receive user inputs, and a pressure determination arrangement (not shown) adapted to determine a pressure applied to the pressure-sensitive input interface by the user when providing the user inputs.

By way of example, the pressure-sensitive input interface 310 may comprise first 310A to fifth 310E buttons, and a pressure determination arrangement may be integrated with the pressure sensitive input 310 so that the pressure sensitive input 310 is positioned directly underneath the first 310A to fifth 310E buttons and thus not visible from the exterior of the PDA 300.

The PDA 300 also comprises a processing unit (not shown) and an output interface 320.

The processing unit may be adapted to determine whether or not to ignore a user input based on the pressure applied to the pressure-sensitive input interface 310 by the user when providing the user input. By way of example, the processing unit may comprise an arrangement of one or more microprocessors housed within the PDA 300 and may be communicatively coupled to the pressure-sensitive input interface 310 and the pressure determination arrangement.

The output interface 320 may be adapted to provide an input acknowledgement signal for indicating a user input was received, irrespective of the whether the processing unit has determined to ignore the user input. For instance, the output interface 320 may be adapted to display a rectangular region 330 within which graphical elements 335 may be displayed to indicate reception of a user input. Each displayed graphical element 335 may be associated with a separately received input. In this way, the number of graphical elements 335 displayed in the rectangular region 330 of the output interface may equal the number of user inputs received via the pressure-sensitive input interface 310.

The apparatus for authenticating a user that is provided by the PDA 300 may automatically and dynamically distinguish between a false and real user input (received via the pressure-sensitive input interface 310) based on a pressure applied when providing the user input.

The apparatus may, for example, process a received user input by analyzing the pressure applied by the user when providing the user input so as to determine if the user input is false (e.g. dummy or fake) or real (e.g. a true input intended by the user to be used as input information). For instance, the processing unit may be adapted to compare the pressure applied with a threshold value, and to determine whether or not to ignore the user input based on the comparison result. By way of example, according to an embodiment, the processing unit may be adapted to determine to ignore the user input if the comparison result indicates the pressure applied is less than the threshold value. Conversely, the processing unit may be adapted to determine to use (e.g. not ignore) the user input if the comparison result indicates the pressure applied is greater than the threshold value. Because such a comparison process is relatively simple, the processing undertaken by the processing unit may be minimal and therefore not impact available processing and/or power resources of the PDA 300. The processing may also be undertaken so quickly that the processing is undertaken in real-time (e.g. practically instantaneously).

The apparatus of the PDA 300 may thus be arranged such that falsified or dummy user inputs are ignored or disregarded. Furthermore, irrespective of the whether the user inputs are ignored, the output interface 320 may provide an input acknowledgement signal whilst providing an acknowledgement signal for indicating all of the user inputs have been used. For instance, the output interface 320 may be adapted to display an input acknowledgement signal comprising a plurality of graphical elements 335 in the rectangular region 330, wherein the number of graphical elements 335 is equal to the number of user inputs received via the pressure-sensitive input interface 310. In this way, the acknowledgement signal may mislead a third-party into thinking that the falsified or dummy user inputs form part of the input information.

For example, the PDA 300 may enable a user to input an authentication code or password via the first 310A to fifth 310E buttons of the pressure-sensitive input interface 310. The inputs provided by the user may comprise dummy or fake component parts (e.g. false button presses) that are indicated as such by the user only pressing lightly (e.g. applying a low pressure) on the pressure-sensitive input interface 310 when the dummy or fake inputs are provided. Such dummy or fake component parts of the input information may be identified by the processing unit (based on the applied pressure) and then disregarded/ignored as inputs. In this way, a third-party observing the user inputting the information may be prevented from learning the correct/real authentication code or password by watching the user input information.

Put another way, the apparatus of the PDA 300 may use applied-pressure information obtained by the pressure determination arrangement to identify and disregard at least one user input whilst providing a visual acknowledgement signal suggesting to an observer that all inputs are true/real (e.g. implying that no user inputs have been disregarded).

Thus, embodiments of the PDA 300 depicted in FIG. 3 may automatically and dynamically identify and disregard dummy inputs provided by a user based on pressure applied by the user when providing the inputs, which may enable a user to identify dummy/fake inputs to the PDA 300 in a quick and simple manner which is not visible to an observing party. The user may also be free to choose in what order or combination to provide the dummy/fake inputs. The embodiment may therefore enable a high degree of flexibility and ease of use for a user.

One or more parts of the apparatus of FIG. 3 may be used in conjunction with applications or systems that require a user to provide secret or sensitive information via the pressure-sensitive input interface 310, and thus may be employed in or with authentication applications, method and/or systems, and the like. For instance, such applications may comprise personal banking functionality, wherein a user is required to input a PIN number/code to access sensitive information and/or functionality.

Embodiments may also be distributed at various positions throughout an authentication system, rather than being located at the location of the pressure-sensitive input interface for example. Taking such an approach may enable processing and/or hardware requirements to be distributed according to requirements, thus potentially reducing cost complexity, and/or resource implications where desired.

Figure 4:
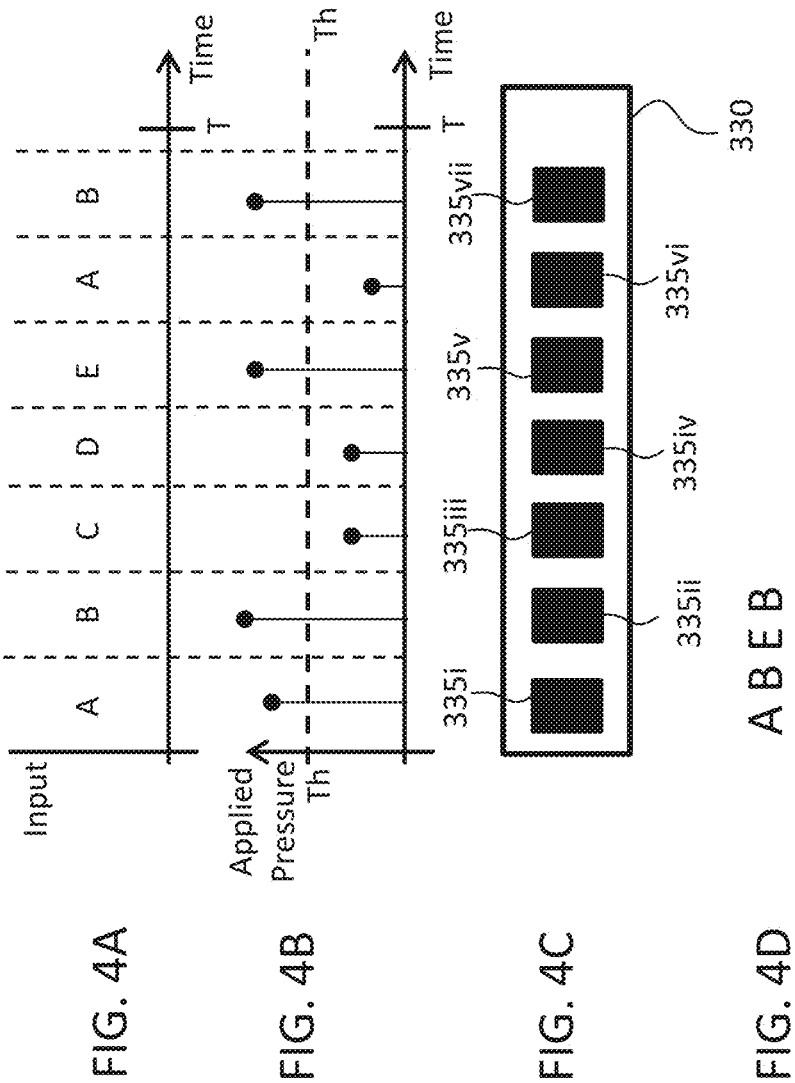
FIG. 4A depicts a sequence of user inputs provided via pressure-sensitive input interface with respect to time, in accordance with embodiments of the present invention
FIG. 4B depicts the pressure applied to pressure-sensitive input interface with respect to time for the same time period as that of FIG. 4A, in accordance with embodiments of the present invention.
FIG. 4C depicts a rectangular region of the output interface as displayed at time T, in accordance with embodiments of the present invention.
FIG. 4D depicts a real/true input as determined by the processing unit and as intended to be provided by the user for use actual input information, in accordance with embodiments of the present invention.

FIG. 4A depicts a sequence of user inputs provided via pressure-sensitive input interface 310 with respect to time, in accordance with embodiments of the present invention.

FIG. 4B depicts the pressure applied to pressure-sensitive input interface 310 with respect to time for the same time period as that of FIG. 4A, in accordance with embodiments of the present invention. FIG. 4C depicts the rectangular region 330 of the output interface 320 as displayed at time T (i.e. after the user inputs have been provided), in accordance with embodiments of the present invention. FIG. 4D depicts the real/true input as determined by the processing unit and as intended to be provided by the user for use actual input information, in accordance with embodiments of the present invention.

Here, the first 310A to fifth 310E buttons are associated with inputs "A" to "E" respectively. An authentication code comprising a sequence of characters selected from the set of "A" to "E" may therefore be input by a user pressing the first 310A to fifth 310E buttons in the appropriate order. By way of example, a user may wish to enter an authentication code "ABEB" using the pressure-sensitive input interface 310 of the PDA 300. However, in doing so, and in accordance with embodiments, the user may attempt to obfuscate the input authentication code by inputting dummy/fake characters when inputting the authentication code. By way of example, the user may input dummy/fake characters such that the user presses the first 310A to fifth 310E buttons in a sequence that indicates the input code as "ABCDEAB".

Referring to FIG. 4A, in this example, the user presses buttons of the pressure-sensitive input interface 310 in an order depicted by the letters in the respective time slots. More specifically, the user presses the buttons in the following order: first button 310A, followed by the second button 310B, followed by the third button 310C, followed by the fourth button 310D, followed by the fifth button 310E, followed by the first button 310A, and then finally the second button 310B.

Referring now to FIG. 4B, the pressure applied by the user to the pressure-sensitive input interface 310 when pressing each of the buttons of the above mentioned order/sequence can be seen.

In particular, it can be seen that the user provides the first input (i.e. pressing first button 310A) by applying a strong (e.g. high) pressure that exceeds a predefined threshold value, Th, thereby indicating that the input ("A") of the first input is a true/real input. The pressure determination arrangement determines a value of the (e.g. strong) pressure and the processing unit compares the determined value of the applied pressure with the threshold value, Th, so as to identify that the value of the applied pressure exceeds the threshold value, Th. In view of identifying the value of the applied pressure exceeds the threshold value, Th, the processing unit determines that the value ("A") of the first input is a true/real input and records the input ("A") as the first component part of the authentication code provided by the user, as depicted in FIG. 4D. Irrespective of the determination made by the processing unit, the processing unit also controls the output interface 320 to display a first graphical element 335*i* in the rectangular region 330, as depicted in FIG. 4C, so as to display an input acknowledgement signal that indicates the first user input provided by the user pressing the first button 310A was received.

Next, FIG. 4B shows that the user provides the second input (i.e. pressing second button 310B) by applying a strong (e.g. high) pressure that exceeds the predefined threshold value, Th, thereby indicating that the input value ("B") of the second input is a true/real input. The pressure determination arrangement determines a value of the (e.g. strong) applied pressure and the processing unit compares the determined value of the applied pressure with the threshold value so as to identify that the value of the applied pressure exceeds the threshold value, Th. In view of identifying that the value of the applied pressure exceeds the threshold value, Th, the processing unit determines that the value ("B") of the second input is a true/real input and records the input ("B") as the second component part of the authentication code provided by the user, as depicted in FIG. 4D. Irrespective of the determination made by the processing unit, the processing unit also controls the output interface 320 to display a second graphical element 335ii in the rectangular region 330, as depicted in FIG. 4C, so as to display an input acknowledgement signal that indicates the second user input provided by the user pressing the second button 310B was received.

Next, FIG. 4B shows that the user provides the third input (i.e. pressing third button 310C) by applying a light (e.g. low) pressure that does not exceed the predefined threshold value, Th, thereby indicating that the input ("C") of the third input is a false/fake input. The pressure determination arrangement determines a value of the (e.g. light) applied pressure and the processing unit compares the determined value of the applied pressure with the threshold value, Th, so as to identify that the value of the applied pressure does not exceed the threshold value, Th. In view of identifying that the value of the applied pressure does not exceed the threshold value, the processing unit determines that the value ("C") of the third input is a false/fake input and disregards the value ("C") of the third input as a component part of the authentication code provided by the user. Irrespective of the determination made by the processing unit, the processing unit also controls the output interface 320 to display a third graphical element 335iii in the rectangular region 330, as depicted in FIG. 4C, so as to display an input acknowledgement signal that indicates the third user input provided by the user pressing the third button 310C was received.

FIG. 4B also shows that the user then provides the fourth input (i.e. pressing fourth button 310D) by applying a light (e.g. low) pressure that does not exceed the predefined threshold value, Th, thereby indicating that the input ("D") of the fourth input is a false/fake input. The pressure determination arrangement determines a value of the (e.g. light) applied pressure and the processing unit compares the determined value of the applied pressure with the threshold value, Th, so as to identify that the value of the applied pressure does not exceed the threshold value, Th. In view of identifying that the value of the applied pressure does not exceed the threshold value, the processing unit determines that the value ("D") of the fourth input is a false/fake input and disregards the value ("D") of the fourth input as a component part of the authentication code provided by the user. Irrespective of the determination made by the processing unit, the processing unit also controls the output interface 320 to display a fourth graphical element 335iv in the rectangular region 330, as depicted in FIG. 4C, so as to display an input acknowledgement signal that indicates the fourth user input provided by the user pressing the fourth button 310D was received.

Referring still to FIG. 4B, the user then provides the fifth input (i.e. pressing fifth button 310E) by applying a strong (e.g. high) pressure that exceeds the predefined threshold value, Th, thereby indicating that the input value ("E") of the fifth input is a true/real input. The pressure determination arrangement determines a value of the (e.g. strong) applied pressure and the processing unit compares the determined value of the applied pressure with the threshold value so as to identify that the value of the applied pressure exceeds the threshold value, Th. In view of identifying that the value of the applied pressure exceeds the threshold value, Th, the processing unit determines that the value ("E") of the fifth input is a true/real input and records the input ("E") as the third component part of the authentication code provided by the user, as depicted in FIG. 4D). Irrespective of the determination made by the processing unit, the processing unit also controls the output interface 320 to display a fifth graphical element 335v in the rectangular region 330, as depicted in FIG. 4C, so as to display an input acknowledgement signal that indicates the fifth user input provided by the user pressing the fifth button 310E was received.

FIG. 4B depicts that the user then provides the sixth input (i.e. pressing first button 310A) by applying a light (e.g. low) pressure that does not exceed the predefined threshold value, Th, thereby indicating that the input value ("A") of the sixth input is a false/fake input. The pressure determination arrangement determines a value of the (e.g. light) applied pressure and the processing unit compares the determined value of the applied pressure with the threshold value, Th, so as to identify that the value of the applied pressure does not exceed the threshold value. Th. In view of identifying that the value of the applied pressure does not exceed the threshold value, the processing unit determines that the value ("A") of the sixth input is a false/fake input and disregards the value ("A") of the sixth input as a component part of the authentication code provided by the user. Irrespective of the determination made by the processing unit, the processing unit also controls the output interface 320 to display a sixth graphical element 335vi in the rectangular region 330, as depicted in FIG. 4C so as to display an input acknowledgement signal that indicates the sixth user input provided by the user pressing the first button 310A was received.

FIG. 4B further depicts that the user then finally provides the seventh input (i.e. pressing second button 310B) by applying a strong (e.g. high) pressure that exceeds the predefined threshold value, Th, thereby indicating that the input value ("B") of the seventh input is a true/real input. The pressure determination arrangement determines a value of the (e.g. strong) applied pressure and the processing unit compares the determined value of the applied pressure with the threshold value so as to identify that the value of the applied pressure exceeds the threshold value Th. In view of identifying that the value of the applied pressure exceeds the threshold value, Th, the processing unit determines that the value ("B") of the seventh input is a true/real input and records the input value ("B") as the fourth component part of the authentication code provided by the user, as depicted in FIG. 4D. Irrespective of the determination made by the processing unit, the processing unit also controls the output interface 320 to display a seventh graphical element 335vii in the rectangular region 330, as depicted in FIG. 4C, so as to display an input acknowledgement signal that indicates the seventh user input provided by the user pressing the second button 310B was received.

From the above example depicted in FIGS. 4A-D, by using or ignoring inputs based on the pressure applied to the pressure-sensitive input interface 310 when entering the inputs, the user may enter inputs, namely the third, fourth and sixth inputs, that, although ignored and not used as component parts of the authentication code, appear to form part of the authentication code by a viewer observing the user and the input acknowledgement signal displayed by the output interface 320 of the PDA 300.

In particular, in the example depicted in FIGS. 4A-D, the embodiment enables the user to input dummy/fake characters such that the user appears (to an observer) to input the authentication code "ABCDEAB", and appearing to input the authentication code may be reinforced by the output interface 320 of the PDA 300 displaying seven graphical elements on the output interface 320 as if all seven inputs provided by the user are received and used by the PDA 300. In this way, the authentication code "ABEB" may be received and used by the PDA 300 whilst being protected from an observer.

Figure 5:
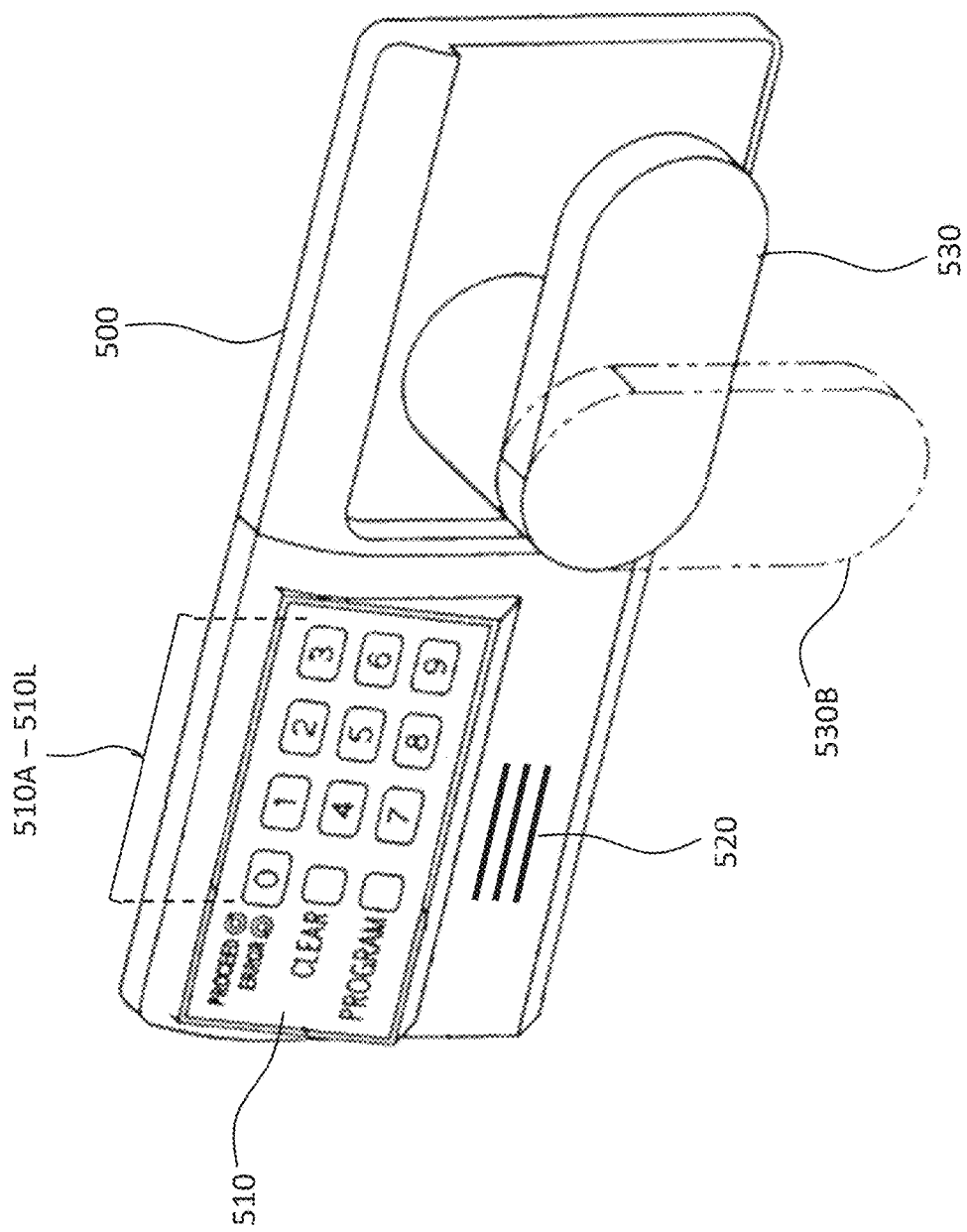
FIG. 5 is a simplified diagram of a door entry system, in accordance with embodiments of the present invention.

FIG. 5 is a simplified diagram of a door entry system, in accordance with embodiments of the present invention. In this example, the door entry system 500 is an electronic-based door-entry system 500, but similar examples may be employed.

The door entry system 500 comprises an apparatus for authenticating a user according to an exemplary embodiment. More specifically, the door entry system 500 comprises a pressure-sensitive input interface 510 adapted to receive user inputs, and a pressure determination arrangement (not shown) adapted to determine a pressure applied to the pressure-sensitive input interface by the user when providing the user inputs.

By way of example, the pressure-sensitive input interface 510 may comprise a numerical keypad having first 510A to twelfth 510L buttons, and a pressure determination arrangement may be integrated with the pressure sensitive input 510 so that the pressure determination arrangement is positioned directly underneath the first 510A to twelfth 510L buttons, and thus not visible from the exterior of the door entry system 500.

The door entry system 500 also comprises a processing unit (not shown), an output interface 520, and a handle 530. The handle 530 may only be turned to an unlocked position as indicated by the dashed-line version of the handle labelled "530B", so as to unlock a door associated with the door entry system for example, if the door entry system 500 determines a user has input authentication information, via the pressure-sensitive input interface 510, indicating the user is authorized to open the door.

The processing unit may be adapted to determine whether or not to ignore a user input based on the pressure applied to the pressure-sensitive input interface 510 by the user when providing the user input. By way of example, the processing unit may comprise an arrangement of one or more microprocessors housed within the door entry system 500 and may be communicatively coupled to the pressure-sensitive input interface 510 and the pressure determination arrangement.

The output interface 520 may be adapted to provide an input acknowledgement signal for indicating a user input was received, irrespective of the whether the processing unit has determined to ignore the user input. For instance, the output interface 520 may be adapted to output an audible sound (e.g. 'beep') to indicate reception of a user input. Each audible sound output may be associated with a separately received input. In this way, the number of output audible signals may equal the number of user inputs received via the pressure-sensitive input interface 510.

The apparatus for authenticating a user that is provided by the door entry system 500 may automatically and dynamically distinguish between a false and real user input received via the pressure-sensitive input interface 510 based on a pressure applied when providing the user input.

The apparatus may, for example, process a received user input by analyzing the pressure applied by the user when providing the user input so as to determine if the user input is false (e.g. dummy or fake) or real (e.g. a true input intended by the user to be used as input information). For instance, the processing unit may be adapted to compare the pressure applied with a threshold value, and to determine to ignore the user input based on the comparison result. By way of example, according to an embodiment, the processing unit may be adapted to determine to ignore the user input if the comparison result indicates the pressure applied is less than the threshold value. Conversely, the processing unit may be adapted to determine to use (e.g. not ignore) the user input if the comparison result indicates the pressure applied is greater than the threshold value. Because such a comparison process is relatively simple, the processing undertaken by the processing unit may be minimal and therefore not impact available processing and/or power resources of the door entry system 500. The processing may also be undertaken so quickly that the processing is undertaken in real-time (e.g. practically instantaneously).

The apparatus of the door entry system 500 may thus be arranged such that falsified or dummy user inputs are ignored or disregarded. Furthermore, irrespective of the whether the user inputs are ignored, the output interface 520 may provide an input acknowledgement signal whilst providing an acknowledgement signal for indicating all of the user inputs have been used. For instance, the output interface 520 may be adapted to output an input acknowledgement signal comprising a plurality of audible sounds, wherein the number of output sounds is equal to the number of user inputs received via the pressure-sensitive input interface 510. In this way, the acknowledgement signal may mislead a third-party into thinking that the falsified or dummy user inputs form part of the input information.

For example, the door entry system 500 may enable a user to input an authentication code or password via the first 510A to tenth 510J buttons (i.e. numbered "0" through "9", respectively) of the pressure-sensitive input interface 510. The inputs provided by the user may comprise dummy or fake component parts (e.g. false button presses) that are indicated as such by the user only pressing lightly (e.g. applying a low pressure) on the pressure-sensitive input interface 510 when the dummy or fake inputs are provided. Such dummy or fake component parts of the input information may be identified by the processing unit (based on the applied pressure) and then disregarded/ignored as inputs. In this way, a third-party observing the user inputting the information may be prevented from learning the correct/real authentication code or password by watching the user input information.

Put another way, the apparatus of the door entry system 500 may use applied-pressure information obtained by the pressure determination arrangement to identify and disregard at least one user input whilst providing a visual acknowledgement signal suggesting to an observer that all inputs are true/real (e.g. implying that no user inputs have been disregarded).

Thus, embodiments of the door entry system 500 of FIG. 5 may automatically and dynamically identify and disregard dummy inputs provided by a user based on pressure applied by the user when providing the inputs, which may enable a user to identify dummy/fake inputs to the door entry system 500 in a quick and simple manner that is not visible to an observing party. The user may also be free to choose in what order or combination to provide the dummy/fake inputs. The embodiment may therefore enable a high degree of flexibility and ease of use for a user.

FIG. 6A depicts a sequence of user inputs provided via pressure-sensitive input interface with respect to time, in accordance with embodiments of the present invention. FIG. 6B depicts the pressure applied to pressure-sensitive input interface with respect to time for the same time period as that of FIG. 6A, in accordance with embodiments of the present invention. FIG. 6C depicts the sounds output by the output interface with respect to time, in accordance with embodiments of the present invention. FIG. 6D depicts the real/true input as determined by the processing unit and as intended to be provided by the user for use actual input information, in accordance.

Here, the first 510A to tenth 510J buttons are associated with inputs "0" to "9" respectively. An authentication code comprising a sequence of numbers selected from the set of "0" to "9" may therefore be input by a user pressing the first 510A to tenth 510J buttons in the appropriate order. By way of example, a user may wish to enter an authentication code "2457" using the pressure-sensitive input interface 510 of the door entry system 500. However, in doing so, and in accordance with embodiments, the user may attempt to obfuscate the input authentication code by inputting dummy/fake characters when inputting the authentication code. By way of example, the user may input dummy/fake characters such that the user presses the first 510A to tenth 510J buttons in a sequence that indicates the input code as "1234567".

Referring to FIG. 6A, the user presses buttons of the pressure-sensitive input interface 510 in the order depicted by the numbers in the respective time slots. More specifically, the user presses the buttons in the following order: second button 510B, followed by the third button 510C, followed by the fourth button 510D, followed by the fifth button 510E, followed by the sixth button 510F, followed by the seventh button 510F, and then finally the eighth button 510G.

Referring now to FIG. 6B, the pressure applied by the user to the pressure-sensitive input interface 510 when pressing each of the buttons of the above mentioned order/sequence can be seen.

In particular, the user provides the first input (i.e. pressing second button 510B) by applying a light (e.g. low) pressure that does not exceed a predefined threshold value, Th, thereby indicating that the input ("1") of the first input is a false/fake input. The pressure determination arrangement determines a value of the (e.g. light) applied pressure and the processing unit compares the determined value of the applied pressure with the threshold value, Th, so as to identify that the value of the applied pressure does not exceed the threshold value. Th. In view of identifying the value of the applied pressure does not exceed the threshold value Th, the processing unit determines that the value ("1") of the first input is a false/fake input and disregards the value ("1") of the first input as a component part of the authentication code provided by the user. Irrespective of the determination made by the processing unit, the processing unit also controls the output interface 520 to output a first audible sound (e.g. beep) as depicted in FIG. 6C so as to output an input acknowledgement signal that indicates the first user input provided by the user pressing the second button 510B was received.

Next, FIG. 6B shows that the user provides the second input (i.e. pressing third button 510C) by applying a strong (e.g. high) pressure that exceeds the predefined threshold value, Th, thereby indicating that the input value ("2") of the second input is a true/real input. The pressure determination arrangement determines a value of the (e.g. strong) applied pressure and the processing unit compares the determined value of the applied pressure with the threshold value so as to identify that the value of the applied pressure exceeds the threshold value, Th. In view of identifying that the value of the applied pressure exceeds the threshold value, Th, the processing unit determines that the value ("2") of the second input is a true/real input and records the input ("2") as the first component part of the authentication code provided by the user, as depicted in FIG. 6D. Irrespective of the determination made by the processing unit, the processing unit also controls the output interface 520 to output a second audible sound (e.g. beep) as depicted in FIG. 6C so as to output an input acknowledgement signal that indicates the second user input provided by the user pressing the third button 510C was received.

Next, FIG. 6B depicts that the user provides the third input (i.e. pressing fourth button 510D) by applying a light (e.g. low) pressure that does not exceed the predefined threshold value, Th, thereby indicating that the input ("3") of the third input is a false/fake input. The pressure determination arrangement determines a value of the (light) applied pressure and the processing unit compares the determined value of the applied pressure with the threshold value, Th so as to identify that the value of the applied pressure does not exceed the threshold value, Th. In view of identifying that the value of the applied pressure does not exceed the threshold value, the processing unit determines that the value ("3") of the third input is a false/fake input and disregards the value ("3") of the third input as a component part of the authentication code provided by the user. Irrespective of the determination made by the processing unit, the processing unit also controls the output interface 520 to output a third audible sound (e.g. beep) as depicted in FIG. 6C so as to output an input acknowledgement signal that indicates the third user input provided by the user pressing the fourth button 510D was received.

Referring still to FIG. 6B, the user then provides the fourth input (i.e. pressing fifth button 510E) by applying a strong (e.g. high) pressure that exceeds the predefined threshold value, Th, thereby indicating that the input value ("4") of the fourth input is a true/real input. The pressure determination arrangement determines a value of the (strong) applied pressure and the processing unit compares the determined value of the applied pressure with the threshold value so as to identify that the value of the applied pressure exceeds the threshold value, Th. In view of identifying that the value of the applied pressure exceeds the threshold value, Th, the processing unit determines that the value ("4") of the fourth input is a true/real input and records the input ("4") as the second component part of the authentication code provided by the user, as depicted in FIG. 6D. Irrespective of the determination made by the processing unit, the processing unit also controls the output interface 520 to output a fourth audible sound (e.g. beep) as depicted in FIG. 6C so as to output an input acknowledgement signal that indicates the fourth user input provided by the user pressing the fifth button 510E was received.

Referring to FIG. 6B, the user then provides the fifth input (i.e. pressing sixth button 510F) by applying a strong (e.g. high) pressure that exceeds the predefined threshold value, Th, thereby indicating that the input value ("5") of the fifth input is a true/real input. The pressure determination arrangement determines a value of the (strong) applied pressure and the processing unit compares the determined value of the applied pressure with the threshold value so as to identify that the value of the applied pressure exceeds the threshold value, Th. In view of identifying that the value of the applied pressure exceeds the threshold value, Th, the processing unit determines that the value ("5") of the fifth input is a true/real input and records the input ("5") as the third component part of the authentication code provided by the user, as depicted in FIG. 6D. Irrespective of the determination made by the processing unit, the processing unit also controls the output interface 520 to output a fifth audible sound (e.g. beep) as depicted in FIG. 6C so as to output an input acknowledgement signal that indicates the fifth user input provided by the user pressing the sixth button 510F was received.

Next, from FIG. 6B, the user then provides the sixth input (i.e. pressing seventh 510G) by applying a light (e.g. low) pressure that does not exceed the predefined threshold value Th, thereby indicating that the input value ("6") of the sixth input is a false/fake input. The pressure determination arrangement determines a value of the (e.g. light) applied pressure and the processing unit compares the determined value of the applied pressure with the threshold value, Th so as to identify that the value of the applied pressure does not exceed the threshold value, Th. In view of identifying that the value of the applied pressure does not exceed the threshold value, the processing unit determines that the value ("6") of the sixth input is a false/fake input and disregards the value ("6") of the sixth input as a component part of the authentication code provided by the user. Irrespective of the determination made by the processing unit, the processing unit also controls the output interface 520 to output a sixth audible sound (e.g. beep) as depicted in FIG. 6C so as to output an input acknowledgement signal that indicates the sixth user input provided by the user pressing the seventh button 510G was received.

Referring still to FIG. 6B, the user then finally provides the seventh input (i.e. pressing eighth button 510H) by applying a strong (e.g. high) pressure that exceeds the predefined threshold value, Th, thereby indicating that the input value ("7") of the seventh input is a true/real input. The pressure determination arrangement determines a value of the (e.g. strong) applied pressure and the processing unit compares the determined value of the applied pressure with the threshold value so as to identify that the value of the applied pressure exceeds the threshold value, Th. In view of identifying that the value of the applied pressure exceeds the threshold value, Th, the processing unit determines that the value ("7") of the seventh input is a true/real input and records the input value ("7") as the fourth component part of the authentication code provided by the user as depicted in FIG. 6D. Irrespective of the determination made by the processing unit, the processing unit also controls the output interface 520 to output a seventh audible sound (e.g. beep) as depicted in FIG. 6C so as to output an input acknowledgement signal that indicates the seventh user input provided by the user pressing the eighth button 510H was received.

From the above example depicted in FIGS. 6A-D, by using or ignoring inputs based on the pressure applied to the pressure-sensitive input interface 510 when entering the inputs, the user may enter inputs, namely the first, third and sixth inputs that, although ignored and not used as component parts of the authentication code, appear to form part of the authentication code by a viewer observing the user and the input acknowledgement signal output by the speaker of the output interface 520 of the door entry system 500.

Figure 6:
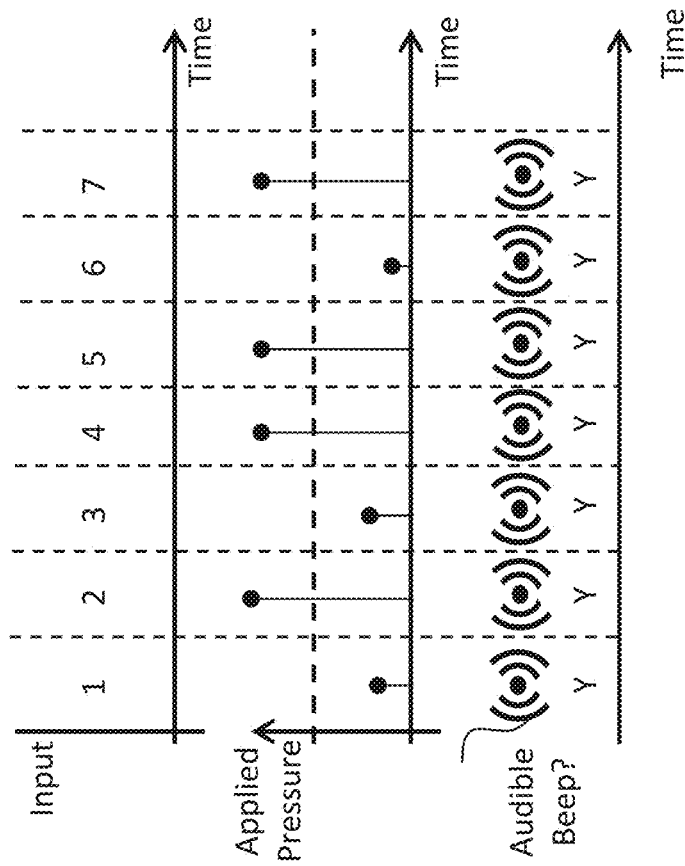
FIG. 6A depicts a sequence of user inputs provided via pressure-sensitive input interface with respect to time, in accordance with embodiments of the present invention.
FIG. 6B depicts the pressure applied to pressure-sensitive input interface with respect to time for the same time period as that of FIG. 6A, in accordance with embodiments of the present invention.
FIG. 6C depicts the sounds output by the output interface with respect to time, in accordance with embodiments of the present invention.
FIG. 6D depicts the real/true input as determined by the processing unit and as intended to be provided by the user for use actual input information, in accordance.

In particular, in the example depicted in FIG. 6-D, the embodiment enables the user to input dummy/fake characters such that the user appears to an observer to input the authentication code "1234567", and appearing to input the authentication code may be reinforced by the output interface 520 making seven audible sounds (e.g. beeps) as if all seven inputs provided by the user are received and used by the door entry system 500. In this way, the authentication code "2457" may be received and used by the door entry system 500 whilst being protected from an observer.

Figure 7:
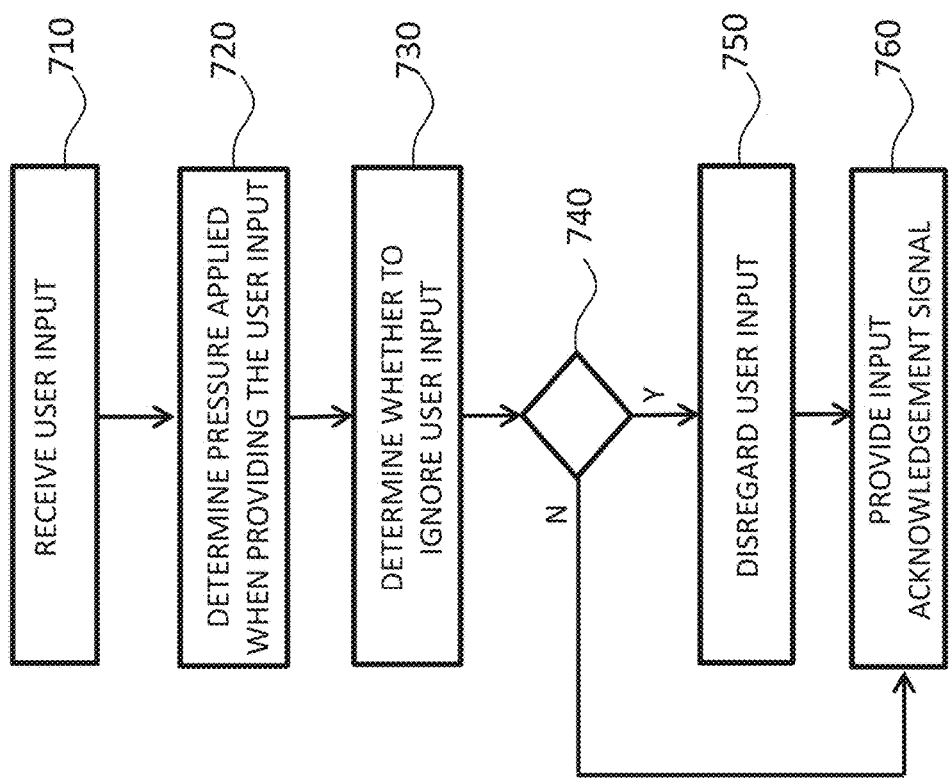
FIG. 7 is a flow diagram of a computer-implemented method, in accordance with embodiments of the present invention.

FIG. 7 is a flow diagram of a computer-implemented method 800, in accordance with embodiments of the present invention. Method 800 according to an embodiment will now be described. The method may enable authentication of a user whilst protecting authentication information provided by the user.

The method may comprise the steps of: receiving 810 a user input via a pressure-sensitive input interface, the user input being indicative of a possible component part of an authentication code or pattern. A pressure applied to the pressure-sensitive input interface by the user when providing the user input is then determined in step 820.

Step 830 determines whether or not to ignore the user input as a component part of the authentication code or pattern based on the pressure applied. By way of example, step 830 of determining whether or not to ignore the user input may comprise comparing the pressure applied with a threshold value and determining whether to ignore the user input based on the comparison result. Step 840, then checks the determination result of step 830 in order to direct the method to the appropriate next step.

If step 830 determines to ignore the user input as a component part of the authentication code or pattern (e.g. if the comparison result from step 830 indicates the pressure applied is less than the threshold value), step 840 directs the method to proceed to step 850 wherein the user input is disregarded (e.g. ignored, not used, etc.) and the method the proceeds to step 860.

If, on the other hand, step 830 determines not to ignore the user input as a component part of the authentication code or pattern (e.g. if the comparison result indicates the pressure applied is greater than or equal to the threshold value), step 840 directs the method to proceed directly to step 860.

In step 860, an input acknowledgement signal is provided via an output interface so as to indicate that the user input was received. By way of example, the input acknowledgement signal may be adapted to communicate a visual signal (e.g. graphical element, visible light signal, colour-based signal, etc.) or an audio signal (e.g. beep, bleep, click, audio sequence, etc.) indicating that the user input was received via the pressure-sensitive input interface.

Step 860 provides an acknowledgement signal irrespective of the whether step 830 determines to ignore the user input.

After completing step 860, the method may return to step 810 so as to repeat the method for further user inputs.

A practical example of an embodiment being used in user authentication may comprise a person using a pressure-sensitive keypad of an ATM, wherein an embodiment would determine whether to use or ignore inputs based on a pressure applied to the pressure-sensitive keypad when a user provides the inputs. Irrespective of whether a user input is ignored or used, an input acknowledgement signal (i.e. such as an audible beep and a displayed graphical symbol) may be provided by the ATM so as to indicate the user input was received.

Figure 8:
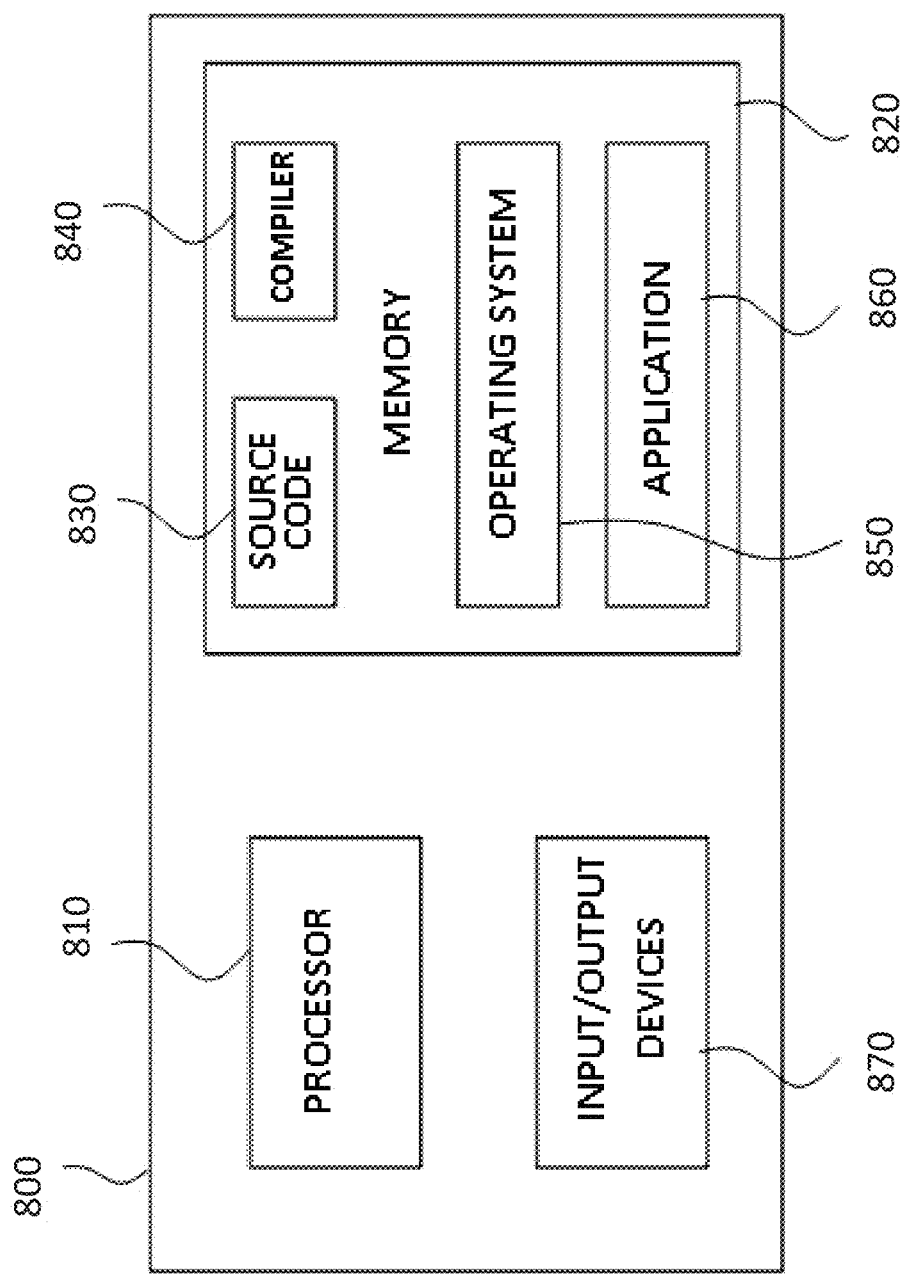
FIG. 8 is a block diagram of a computer device, in accordance with embodiments of the present invention.

FIG. 8 is a block diagram of a computer device, in accordance with embodiments of the present invention. Various operations discussed above may utilize the capabilities of the computer 800. For example, one or more parts of a system for authenticating a user may be incorporated in any element, module, application, and/or component discussed herein.

The computer 800 includes, but is not limited to, PCs, workstations, laptops, PDAs, palm devices, smartphones, image capture devices, video capture devices, internet-enabled displays, servers, storages, and the like. Generally, in terms of hardware architecture, the computer 800 may include one or more processors 810, memory 820, and one or more I/O devices 870 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 810 is a hardware device for executing software that can be stored in the memory 820. The processor 810 can be virtually any custom made or commercially available processor, a central processing unit (CPU), a digital signal processor (DSP), or an auxiliary processor among several processors associated with the computer 800, and the processor 810 may be a semiconductor based microprocessor (in the form of a microchip) or a microprocessor.

The memory 820 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 820 may incorporate electronic, magnetic, optical, and/or other types of storage media. Note that the memory 820 can have a distributed architecture, where various components are situated remote from one another, but can be accessed by the processor 810.

The software in the memory 820 may include one or more separate programs, each of which comprises an ordered listing of executable instructions for implementing logical functions. The software in the memory 820 includes a suitable operating system (O/S) 850, compiler 840, source code 830, and one or more applications 860 in accordance with exemplary embodiments. As illustrated, the application 860 comprises numerous functional components for implementing the features and operations of the exemplary embodiments. The application 860 of the computer 800 may represent various applications, computational units, logic, functional units, processes, operations, virtual entities, and/or modules in accordance with exemplary embodiments, but the application 860 is not meant to be a limitation.

The operating system 850 controls the execution of other computer programs, and provides scheduling, input-output control, file and data management, memory management, and communication control and related services. It is contemplated by the inventors that the application 860 for implementing exemplary embodiments may be applicable on all commercially available operating systems.

Application 860 may be a source program, executable program (object code), script, or any other entity comprising a set of instructions to be performed. When a source program, then the program is usually translated via a compiler (such as the compiler 840), assembler, interpreter, or the like, which may or may not be included within the memory 820, so as to operate properly in connection with the O/S 850. The I/O devices 870 may include input devices such as, for example but not limited to, a mouse, keyboard, scanner, microphone, camera, etc. Furthermore, the I/O devices 870 may also include output devices, for example but not limited to a printer, display, etc. Finally, the I/O devices 870 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 870 also include components for communicating over various networks, such as the Internet or intranet.

If the computer 800 is a PC, workstation, intelligent device or the like, the software in the memory 820 may further include a basic input output system (BIOS) (omitted for simplicity). The BIOS is a set of essential software routines that initialize and test hardware at startup, start the O/S 850, and support the transfer of data among the hardware devices. The BIOS is stored in some type of read-only-memory, such as ROM, PROM, EPROM, EEPROM or the like, so that the BIOS can be executed when the computer 800 is activated.

When the computer 800 is in operation, the processor 810 is configured to execute software stored within the memory 820, to communicate data to and from the memory 820, and to generally control operations of the computer 800 pursuant to the software. The application 860 and the O/S 850 are read, in whole or in part, by the processor 810, perhaps buffered within the processor 810, and then executed.

When the application 860 is implemented in software it should be noted that the application 860 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 860 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one embodiment, the system of the present invention may be or include a hardware device such as a computer, portable device, etc. In one embodiment, the hardware device is or includes a special-purpose device (e.g., computer, machine, portable device) that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

A computer program product of the present invention may include one or more computer readable hardware storage devices having computer readable program code stored therein, said program code containing instructions executable by one or more processors of a computing system (or computer system) to implement the methods of the present invention.

A computer system of the present invention may include one or more processors, one or more memories, and one or more computer readable hardware storage devices, said one or more hardware storage devices containing program code executable by the one or more processors via the one or more memories to implement the methods of the present invention.

What is claimed is:

1. A method for authenticating a user, the method comprising:
    receiving, by a processor of a computing system, a plurality of user inputs via a pressure-sensitive input interface having a plurality of different input options, the user inputs being indicative of a possible component part of an authentication code or pattern defined by a combination of the different input options;
    determining, by the processor, a pressure applied to the pressure-sensitive input interface by the user when providing the user inputs;
    distinguishing, by the processor, real user inputs that represent a component part of the authentication code or pattern from fake user inputs that do not represent a component part of the authentication code or pattern, based on the pressure applied to the pressure-sensitive input interface;
    ignoring, by the processor, the fake user inputs; and
    irrespective of the whether a user input is a real user input or a fake user input, providing, by the processor, an input acknowledgement signal to an output interface for indicating the user input was received.

2. The method of claim 1, further comprising
    providing, by the processor, a haptic feedback signal to the user based on the pressure applied, the haptic feedback signal being indicative of whether the user input is ignored as the component part of the authentication code or pattern.

3. The method of claim 1, wherein the step of distinguishing real user inputs from fake user inputs comprises:
    comparing, by the processor, the pressure applied with a threshold value; and
    determining, by the processor, that the user put is a fake user input if a result of the comparing indicates that the pressure applied is less than the threshold value.

4. The method of claim 1, wherein the input acknowledgement signal is adapted to cause the output interface to communicate a visual or audio signal indicating that the user input was received via the pressure-sensitive input interface.

5. A computer program product, comprising a computer readable hardware storage device storing a computer readable program code, the computer readable program code comprising an algorithm that when executed by a computer processor of a computing system implements a method for user authentication, the method comprising:
    receiving, by a processor of a computing system, a plurality of user inputs via a pressure-sensitive input interface having a plurality of different input options, the user inputs being indicative of a possible component part of an authentication code or pattern defined by a combination of the different input options;
    determining, by the processor, a pressure applied to the pressure-sensitive input interface by the user when providing the user inputs;
    distinguishing, by the processor, real user inputs that represent a component part of the authentication code or pattern from fake user inputs that do not represent a component part of the authentication code or pattern, based on the pressure applied to the pressure-sensitive input interface;
    ignoring, by the processor, the fake user inputs; and
    irrespective of the whether a user input is a real user input or a fake user input, providing, by the processor, an input acknowledgement signal to an output interface for indicating the user input was received.

6. The computer program product of claim 5, further comprising:
    providing, by the processor, a haptic feedback signal to the user based on the pressure applied, the haptic feedback signal being indicative of whether the user input is ignored as the component part of the authentication code or pattern.

7. The computer program product of claim 5, wherein the step of distinguishing real user inputs from fake user inputs comprises:
    comparing, by the processor, the pressure applied with a threshold value; and
    determining, by the processor, that the user input is a fake user input if a result of the comparing indicates that the pressure applied is less than the threshold value.

8. The computer program product of claim 5, wherein the input acknowledgement signal is adapted to cause the output interface to communicate an audible or visual signal indicating that the user input was received via the pressure-sensitive input interface.

9. The computer program product of claim 5, wherein the computer-readable hardware storage device is selected from the group consisting of: a CD, a DVD, a flash memory card, a USB memory stick, a random access memory, a read-only memory, a computer hard disk, a storage area network, a network server, and an Internet server.

10. A computer system comprising:
    a processor;
    a memory device coupled to the processor; and
    a computer readable storage device coupled to the processor, wherein the storage device contains program code executable by the processor via the memory device to implement a method for user authentication, the method comprising:
        receiving, by a processor of a computing system, a plurality of user inputs via a pressure-sensitive input interface having a plurality of different input options, the user inputs being indicative of a possible component part of an authentication code or pattern defined by a combination of the different input options;
        determining, by the processor, a pressure applied to the pressure-sensitive input interface by the user when providing the user inputs;

distinguishing, by the processor, real user inputs that represent a component part of the authentication code or pattern from fake user inputs that do not represent a component part of the authentication code or pattern, based on the pressure applied to the pressure-sensitive input interface;

ignoring, by the processor, the fake user inputs; and irrespective of the whether a user input is a real user input or a fake user input, providing, by the processor, an input acknowledgement signal to an output interface for indicating the user input was received.

11. An apparatus for authenticating a user, the apparatus comprising:

a pressure-sensitive input interface having a plurality of different input options, the pressure-sensitive input interface adapted to receive a plurality of user inputs, the user input being indicative of a possible component part of an authentication code or pattern defined by a combination of the different input options;

a pressure determination arrangement adapted to determine a pressure applied to the pressure-sensitive input interface by the user when providing the user inputs;

a processing unit adapted to distinguish real user inputs that represent a component part of the authentication code or pattern from fake user inputs that do not represent a component part of the authentication code or pattern, based on the pressure applied to the pressure-sensitive input interface, and ignore the fake user inputs; and an output interface adapted to provide an input acknowledgement signal for indicating the user inputs were received, irrespective of the whether the a user input is a real user input or a fake user input.

12. The apparatus of claim 11, further comprising:

a haptic feedback arrangement adapted to provide a haptic feedback signal to the user based on the pressure applied, the haptic feedback signal being indicative of whether the user input is ignored as the component part of the authentication code or pattern.

13. The apparatus of claim 11, wherein the processing unit s adapted to compare the pressure applied with a threshold value, and to determine that the user input is a fake user input if a result of a comparison indicates that the pressure applied is less than the threshold value.

14. The apparatus of claim 11, wherein the output interface is adapted to communicate, based on the input acknowledgement signal, an audible or visible signal indicating that the user input was received via the pressure-sensitive input interface.

15. A mobile computing device comprising the apparatus for authenticating a user according to claim 11.

16. A user input device comprising the apparatus for authenticating a user according to claim 11.

\* \* \* \* \*